(12) United States Patent
Ross et al.

(10) Patent No.: US 6,332,098 B2
(45) Date of Patent: *Dec. 18, 2001

(54) METHODS FOR SHIPPING FREIGHT

(75) Inventors: Michael J. Ross, Arlington; James E. Segars; William G. Cummings, both of Memphis, all of TN (US); Carlos M. Barrios, Miami, FL (US); Ravishanke V. Gampa, Calgary (CA)

(73) Assignee: Fedex Corporation, Memphis, TN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,195

(22) Filed: Aug. 6, 1999

(Under 37 CFR 1.47)

Related U.S. Application Data

(60) Provisional application No. 60/095,922, filed on Aug. 7, 1998.

(51) Int. Cl.[7] .................................................. G06F 7/00
(52) U.S. Cl. ......................... 700/226; 700/214; 700/215; 700/227; 414/807
(58) Field of Search .................................. 700/213, 214, 700/215, 225, 226, 227; 414/807, 273, 808, 809

(56) References Cited

U.S. PATENT DOCUMENTS

| | | | |
|---|---|---|---|
| 4,595,331 | * | 6/1986 | Thompson et al. ................. 414/347 |
| 5,712,789 | * | 1/1998 | Radican .......................... 364/478.14 |
| 5,768,140 | * | 6/1998 | Swartz et al. ................... 364/478.13 |
| 5,877,962 | * | 3/1999 | Radcliffe ........................ 364/478.03 |
| 5,953,234 | * | 9/1999 | Singer et al. ................... 364/478.02 |

* cited by examiner

Primary Examiner—Christopher P. Ellis
Assistant Examiner—Khoi H. Tran
(74) Attorney, Agent, or Firm—Finnegan, Henderson, Farabow, Garrett & Dunner, L.L.P.

(57) ABSTRACT

A method for staging and shipping articles of freight at a transfer facility by which a radio frequency tag capable of receiving and storing transactional data is placed on each of a plurality of articles of freight, the data regarding the article on which the tag placed. After determining at least the approximate weight and outer dimensions of each article of freight, transactional data representative of at least the weight, the outer dimensions, and the desired destination of the article of freight are transferred to and stored in the respective radio frequency tags. As each article of freight is transferred from one location to another within the facility, the transactional data from each radio associated frequency tag is read and stored in one or more memory devices. The articles of freight are temporarily stored in an intermediate holding area, based on the transactional data and a programmed computer interconnected with a memory device storing said transactional data, and the articles of freight are sequentially loaded, based on the transactional data and a programmed computer interconnected with a memory device storing said transactional data.

18 Claims, 10 Drawing Sheets

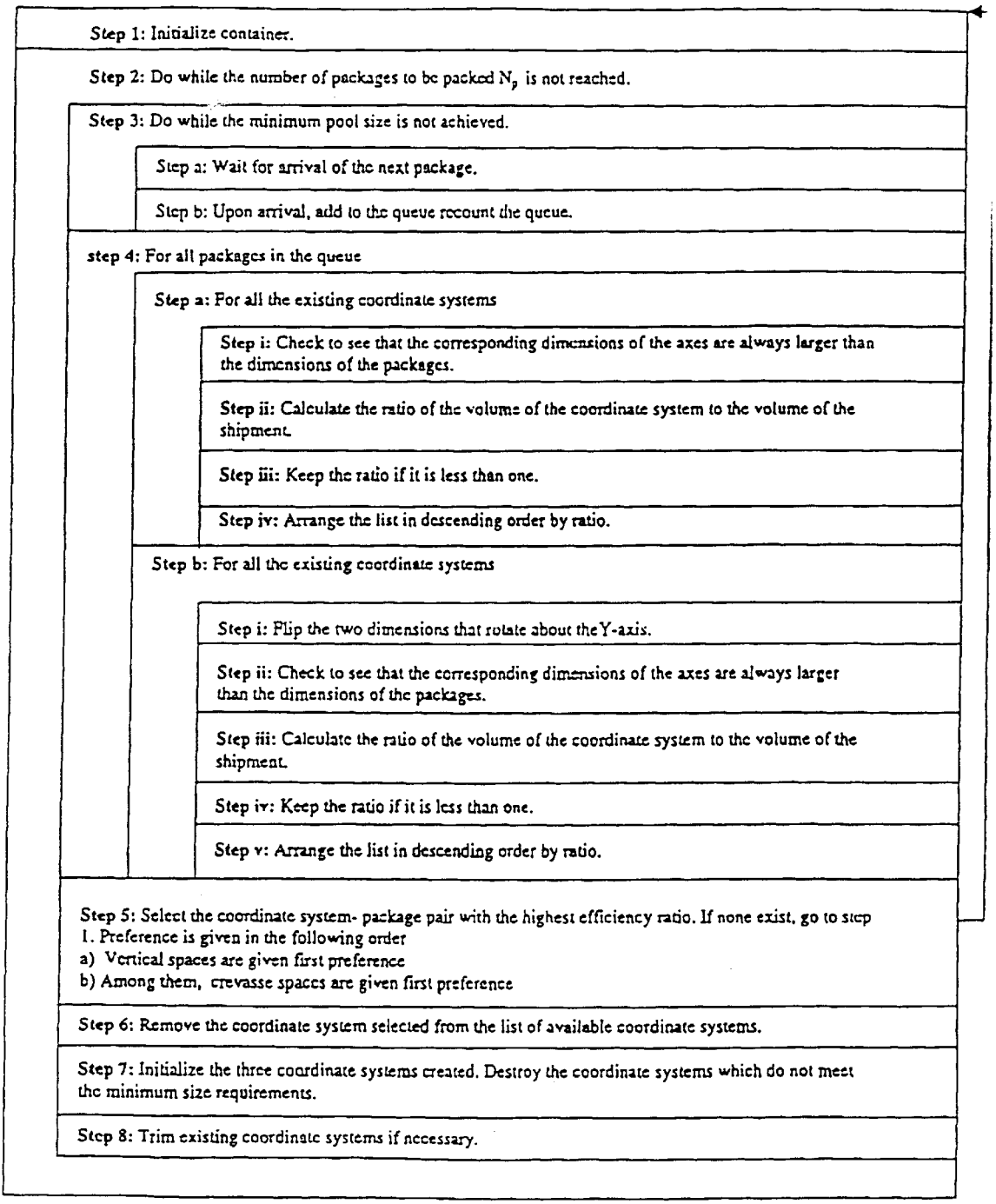

METHODS FOR SHIPPING FREIGHT

The present application is based upon provisional application Ser. No. 60/095,922, filed on Aug. 7, 1998 and hereby incorporated by reference. The invention relates to methods and systems for staging and shipping freight at a freight receiving and shipping facility.

BACKGROUND OF THE INVENTION

A variety of freight (from small boxes to the large materials and products on skids) is transported throughout the world, utilizing aircraft as a primary shipping carrier. Typically the freight is picked-up by a shippers employee, loaded onto a truck, and then transported to receiving and shipping facilities where the articles of freight are sorted, combined in Unit Load Devices (ULDs), and loaded into aircraft that transport the packages and freight either directly to or toward their ultimate destination, or to one or more intermediate facilities. At intermediate facilities, the freight is unloaded and sorted again and then combined and loaded onto another aircraft, or other large transportation vehicles such as a train or truck. Small articles of freight such as packages and boxes often are unloaded, sorted, and reloaded by hand, while larger articles of freight, particularly freight on skids, are typically loaded and unloaded by forklift trucks. They also can be transported by conveyors. The packages and freight often are ultimately transported by truck to the final destination.

The customers whose freight is shipped generally pay for the shipping service, based on the weight and size of the freight and the distance the freight is shipped, among other factors. There has been and is a need to efficiently collect and keep data regarding the freight and to optimize the sorting and loading of the freight throughout the shipping process.

Typically, freight to be shipped is ultimately packed in Unit Load Devices (ULDs) which, in turn, are loaded onto and unloaded from aircraft. Large items of freight are loaded and unloaded from ULDs by forklift trucks, based on the operator's individual training and experience. If these ULDs are not loaded efficiently, they are not loaded as fully as possible, resulting in wasted space and money. If the weight of the freight or its dimensions are not accurately determined, billing information is incorrect. In addition, the current measurement systems of the dimensions of an article of freight are often time consuming and inexact. These problems are further complicated by the fact that shippers normally have a limited amount of time to unload, sort, measure, and load freight, in view of the expedited nature of the requested shipping service.

At present, the loading and unloading of freight, the weighing and measuring of freight, and the loading and unloading of ULDs is performed based upon the individual training and expertise of the particular person or persons loading the ULDs. The present invention is directed to methods and systems designed to increase the efficiency of the loading and billing process and make it more uniform.

SUMMARY OF THE INVENTION

An object of the present invention is to provide improved methods and systems for staging and shipping freight at a receiving and shipping facility.

Additional objects and advantages of the invention will be set forth in part in the description which follows and in part will be obvious from the descrption, or may be learned by practice of the invention. The objects and advantages of the invention will be realized and attained by means of the elements and combinations particularly pointed out in the dependent claims.

To achieve the objects and in accordance with the purpose of the invention, as embodied and broadly described herein, the invention comprises a method for staging and shipping articles of freight at a transfer facility comprising the steps of placing on each of a plurality of articles of freight a radio frequency tag capable of receiving and storing transactional data regarding the article to which it is placed; determining at least the approximate weight and outer dimensions of each article of freight; transferring to and storing in said radio frequency tags transactional data representative of at least the weight, the outer dimensions, and the desired destination of the article of freight on which a respective radio frequency tag is placed; reading transactional data from each radio frequency tags as its associated article of freight is transferred from one location to another within the facility and storing the read transactional data in one or more memory devices; temporarily storing the articles of freight in an intermediate holding area, based on the transactional data and a programmed computer interconnected with a memory device storing said transactional data; and sequentially loading the articles of freight into one or more ULDs, based on the transactional data and a programmed computer interconnected with a memory device storing said transactional data.

In a preferred embodiment, the method of the present invention further includes the steps of placing on the articles of freight an identifying bar code associated with transactional data regarding the article of freight on which it is placed, scanning the bar code on each article of freight, and transferring to the radio frequency tag associated with each article of freight the identifying data on the bar code associated with that article of freight. A readable code identifying the destination of each article of freight can be placed on the articles of freight, so that this code can be read by a scanning device and then transferred to the radio frequency tag associated with the article of freight. Preferably, the articles of freight are transferred by a mechanical apparatus or device that can weigh the articles of freight while they are on the mechanical apparatus. Data representing the weight of the articles of freight can then be transferred to the radio frequency tag. Instructions are provided to the operator of the mechanical apparatus, such as a fork lift truck, regarding the transfer and loading of the articles of freight, based on the transactional data and a programmed computer interconnected with a memory device storing the transactional data.

In a preferred embodiment, the articles of freight are temporarily held at an intermediate holding zone that includes a plurality of preselected temporary storage locations for the articles of freight. A radio frequency tag sensor is placed at each temporary storage location, so that it can read transactional data from the radio frequency tag on a given article of freight, when it is placed at a given temporary storage location. The sensed transactional data for a given article is then transferred to a memory device to which the programmed computer is interconnected. The programmed computer will know where the article is at any given time and can use that information to determine loading sequences, provide loading instructions to personnel at the facility responsible for unloading, staging, and loading the articles, and perform quality checks to ensure that the articles are not forgotten or misdirected.

The facility includes a loading area having a plurality of preselected outbound locations where unit containers are to be loaded with articles of freight. A radio frequency tag sensor is provided at each of said outbound locations to read transactional data from an RF tag of a given article of freight, when it is transferred toward or to a given outbound location. The sensed transactional data is then transferred to a memory device to which the programmed computer is interconnected.

The invention further comprises systems that are capable of practicing the above methods. Examples of such systems are described below.

It is to be understood that both the foregoing general description and the following detailed description are exemplary and explanatory only and are not restrictive of the invention, as claimed.

The accompanying drawings, which are incorporated in and constitute a part of the specification, illustrate embodiments of the invention and together with the description, serve to explain the principles of the invention.

BRIEF DESCRIPTION OF THE DRAWINGS

FIG. 11 is a chart representing a loading algorithm used in the computer system of FIG. 10.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
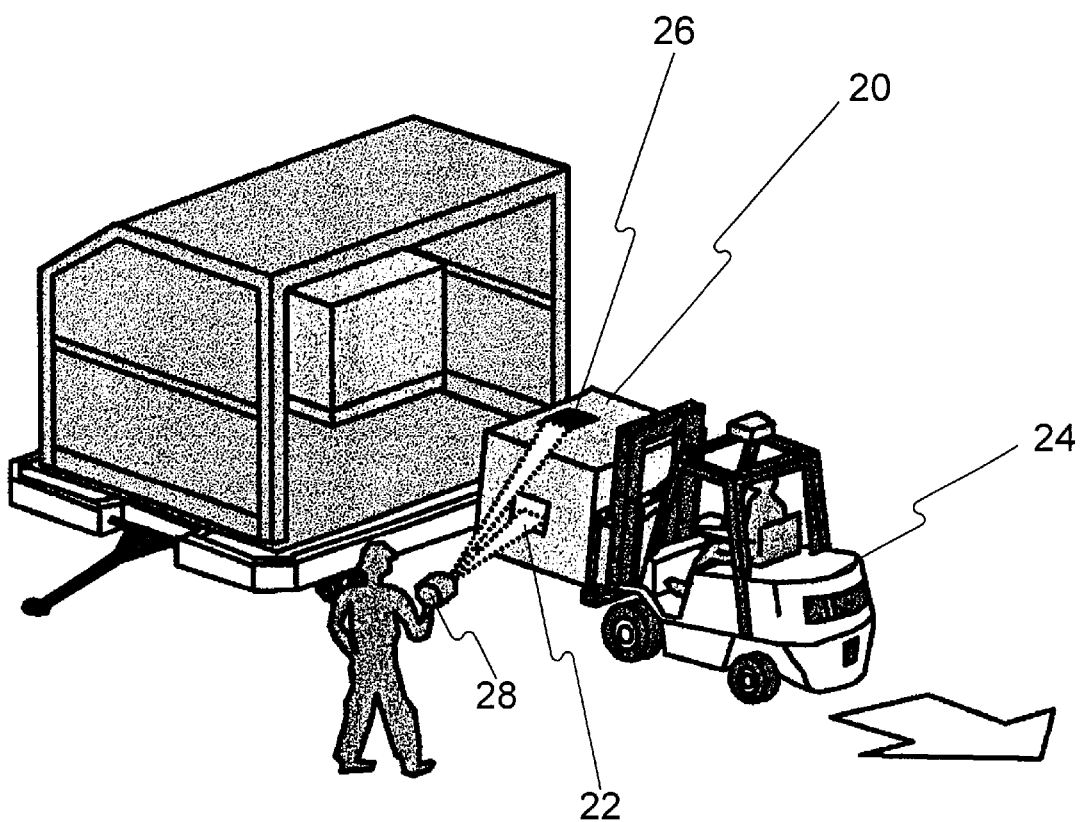
FIG. 1 is a perspective view depicting an unloading zone of a receiving and shipping facility representing an embodiment of the present invention.
Figure 9:
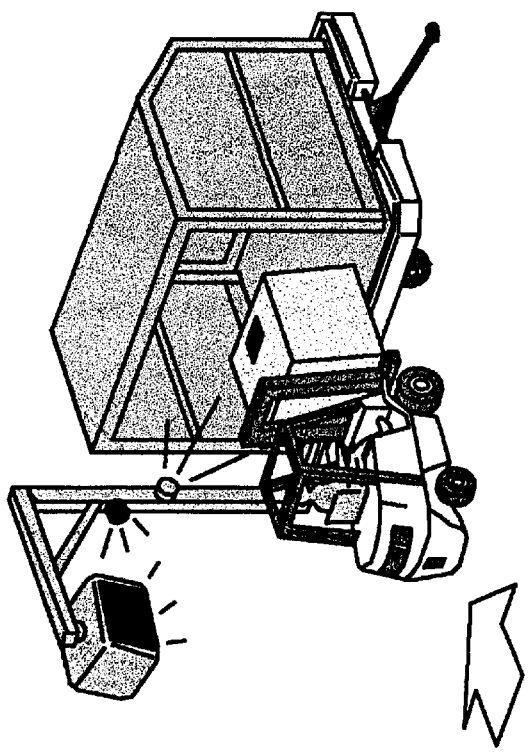
FIG. 9 is a view similar to FIGS. 7 and 8 but depicting the loading of an article of freight into a container or ULD.
Figure 9:
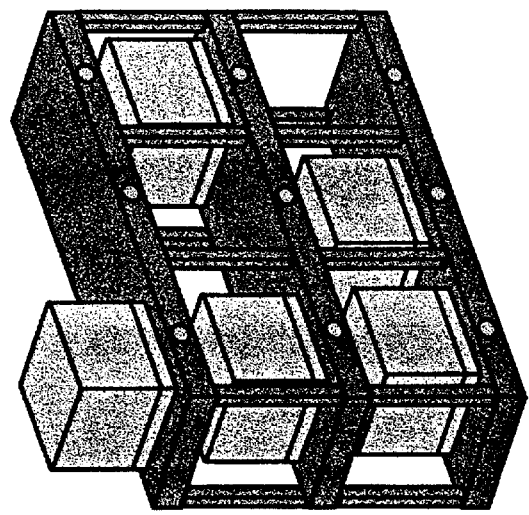

The present invention is directed to methods and systems for staging and shipping freight, collecting data regarding the location, weight and dimensions of the freight, and using this collected data along with other transactional data, to facilitate efficient and economic loading and transportation of the freight. The transactional data can also be used to track the freight, generate manifests, and bill the shipper's customers for shipment. The term "freight" broadly includes all types of packages and goods to be shipped from one location to another, including products that are unitized to a base, typically shrink-wrapped or banded to form units called "skids," as well as non-skidded products. The invention includes systems and methods for efficiently loading freight in standard-sized containers such as aluminum aircraft pallets for air transport, collectively referred to as Unit Load Devices (ULD), as well as into the beds or trailers of variously sized land vehicles. An example of an ULD is shown in FIGS. 1 and 9, by means of example only. As shown, these devices are large containers for holding many separate articles of freight.

The present invention can be used with a sophisticated tracking system that enables its operators to track shipments and assist in the efficient pick-up and delivery of the freight. Such systems are known in the art and include computerized systems and bar code devices which are used to input shipping data, generate bar code labels for the items of freight, and read the bar code labels. The bar code reading devices scan bar codes on the packages, as they are picked-up, transported, and delivered. These bar code readers in turn are capable of transferring shipping and other data to an intermediate computer, typically in a truck, or directly to central computer systems. When such an intermediate device is used, it in turn transfers the information (often through radio transmission) to another intermediate computer or directly to the ultimate system computer which is used to track the freight and assist in the billing and delivery of the freight. Such integrated systems permit its user to provide a variety of efficient services, including periodic advice to the delivery persons, advising them of how to most efficiently pick-up and deliver the freight on a particular day, based upon software and data in the computer. The system also allows its user and its customers to track freight as it is shipped.

In the preferred embodiment, the methods and systems of the present invention are used to unload, stage, and reload articles of freight that are picked up, shipped, and delivered by a company having a relatively sophisticated tracking system. The methods and systems of the invention are preferably practiced or used at a transfer facility, where a plurality of articles of freight are brought, sorted, inventoried, and loaded into unitary containers that are then transported by aircraft or other bulk transportation devices, such as trains or ships. Preferably, by the time the articles of freight are brought to the transfer facility, each item of freight preferably has already been placed into the tracking system. The articles of freight are often brought to the transfer facility in small or intermediate sized trucks, either individually or in large unitary containers. Preferably, each article of freight includes a bar code label with a bar code associated with the transactional data within the centralized computer system. Each article of freight also preferably includes a destination code, in the form of a series of letters or numbers or both.

An example of the procedures followed and devices and systems used in an embodiment of the invention is disclosed below, for purposes of illustration only. As shown in FIG. 1, when an article of freight, such as a skidded freight 20 arrives at a facility, it will already have a bar code label 22 on it, as well as a destination code. Preferably transactional data relating to that freight and bar code will also be in a central computer system. For example, the information in the computer system will preferably include the nature of the article, the person from whom the article was picked-up, the date and time of the pick-up, the intended destination of the article, the proposed time and place of delivery, and so forth. The freight, if large, preferably is transported at the facility by a fork lift truck 20, or a conveyor system.

At the facility, or even before the freight reaches the facility, a blank radio frequency (RF) tag 26 is fixed to each skidded piece of freight, either directly or through a pouch adhered to the article. For example, the RF tag can be placed on the freight as it is unloaded from a container or truck that carries the freight to the facility. According to the invention, the RF tag is programmable to contain transactional data as well as identification data associated with the bar code label or similar identifying symbols on the article of freight. In a preferred embodiment, the bar code label on an article of freight is read by a scanner/programmer (interrogatory device) 28 similar to a commercially available scanning device known as the Savi INTERROGATOR™. This device can read the bar code label on the article of freight and programs an RF tag with the information, or transfers the read information to the RF tag via radio frequency. The interrogator device preferably either receives this information, through scanning or manual input, or both, and then transfers the data to the RF tag via radio frequency. While the described example of the invention references RF tags and transmissions of data to and from such tags, the invention is not limited to only such examples but instead includes any present or future memory tags or similar devices that can be attached to an article of freight and can be used to receive, store, and transfer data as the article of freight is transferred from one location to another.

In the preferred embodiment the information on the article of freight, or its bar code label, includes "destination" data, such as a 3 letter identification ("ID") code, indicating the ultimate destination of the article of freight. Preferably, the invention also includes a device or system for weighing the article of manufacture, most preferably when the article is held by a transfer device, such as a fork lift or conveyor. The invention also includes a system for sensing and determining the outer dimensions and relative size of the articles of freight and storing such transactional data. Preferably, this system can sense and determine the size and shape of the articles as they are being transported by forklift within the transfer facility without having to go to a stationary position.

Preferably, data regarding the bar code identification data, the destination data, and the weight and shape of the article are all loaded into the RF tag 26. The data loaded on the RF tag can be readily read and downloaded to one or more memory devices as the articles of freight are moved through the facility. Information and data already in the centralized system, and thereby associated with a particular identification code such as a bar code number, can also be downloaded to one or more memory devices included in the system of the present invention. A programmed computer, interconnected with a memory device having all or portions of a such transactional data, instructs operators how to stage and load the articles of freight efficiently and effectively, based on the transactional data and known and desired relationships. The computer is programmed to run software designed to determine preferred or optimum loading sequences for a given set of circumstances. The information and determinations are used to provide instructions for the forklift operators at the transfer facility. The invention contemplates the use of a variety of different software programs, depending upon the characteristics of a given shipper's business.

Figure 2:
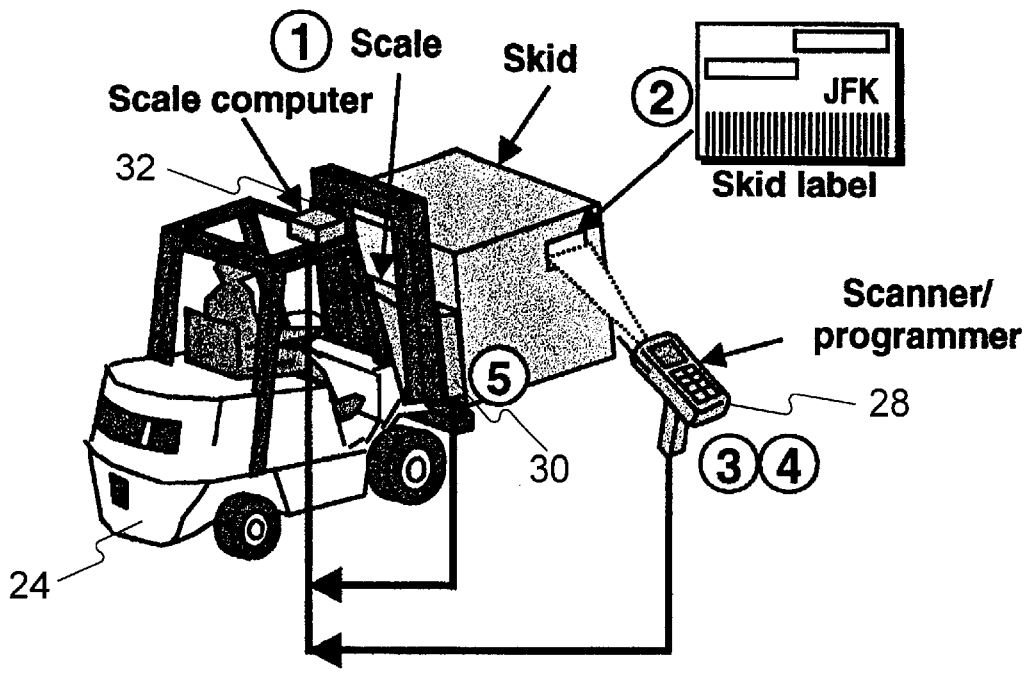
FIG. 2 is a partially schematic isometric view illustrating a forklift vehicle used in an embodiment of the invention and illustrating a barcode skid label attached to an article of freight upon receipt at the receiving and shipping facility.
Figure 3:
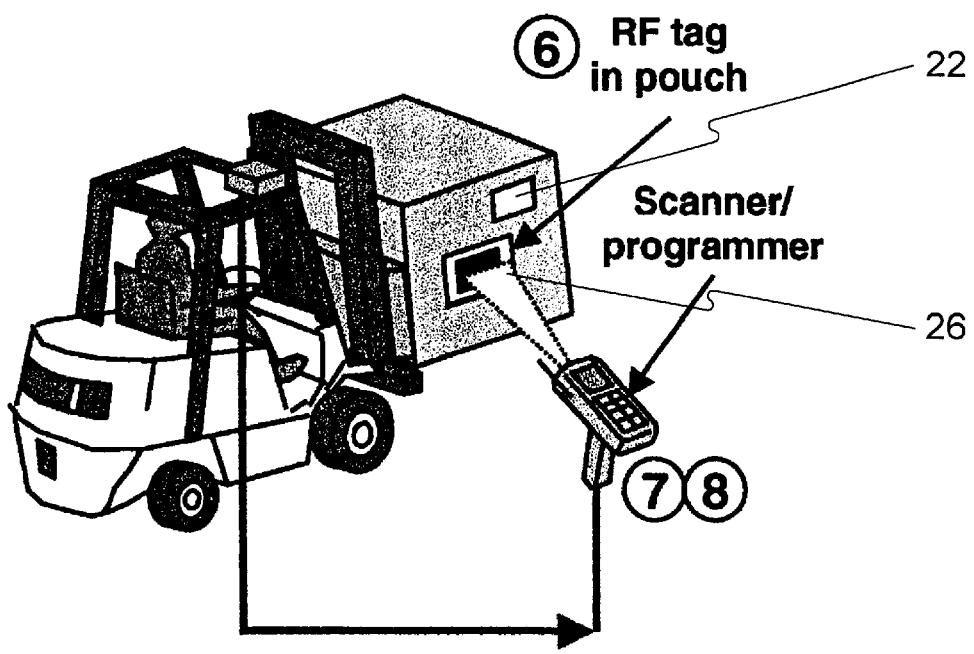
FIG. 3 is a view similar to FIG. 2 and in conjunction with FIG. 1, illustrates the use of a scanner programmer for viewing the barcode label of FIG. 1 and programming an RF Tag attached to each article of freight at the receiving area depicted in FIG. 1.

In the embodiment illustrated generally in FIGS. 1 through 3, a forklift truck 24 includes a scale system consisting of a scale 30 and a scale computer 32. A scanner/programmer 28 is also preferably associated with each fork lift truck. Each article of freight includes a label with a package tracking number and a bar coded format and a destination identification, such as a 3 letter combination. The driver picks up the article of freight, and the scale on the forklift senses or weighs the skid and transfers the data or determined weight to a scale computer memory. An employee, for example a driver of a fork lift truck, uses a scanner/programmer to scan the bar code on article of freight, and the scanned information is held in the a computer memory device. That memory can be the same memory used with the weighing system on the fork lift. The driver then either scans or keys in the destination 3-letter ID on the article of freight, or its label, and that information is also passed to the computer memory. Preferably, the information on the fork lift computer memory is then downloaded to the scanner/programmer, by any conventional means. The scanner/programmer in turn is activated to send an RF signal to program the transactional data to the RF tag on the article.

According to the invention, the forklift operator moves the skidded freight toward and through a staging assignment area 40. In the embodiment shown in FIG. 4, the invention includes an arch 42 or similar area or zone located between the initial unloading zone and the final loading zone of the transfer facility. The arch or zone preferably includes a digital camera 44, an RF tag reader 46, a display device 48, and a scanning system 50 to determine the dimensions of the freight. These devices need not be directly attached to a physical arch or similar structure but instead can be associated with the zone or area, so that they are in sufficient close proximity to achieve the desired functions.

As the operator drives the forklift and freight toward the arch 40, the RF scanner 46 will interrogate the RF tag 26 and transfer the transactional data (e.g. bar code ID, destination ID, and weight) to a local computer or memory device on the arch, or associated with the arch zone. As an alternative, the data loaded onto the memory device on the fork lift can be transferred and downloaded to the local computer at the arch zone. The local computer in turn is preferably connected, directly or indirectly, to the central computer system. As the forklift operator travels toward the arch, the computer system uses this information to develop instructions for the operator and then provide the instructions to the operator, preferably on a video display at the arch zone. The instructions, which can be visual, audio, or audiovisual in nature, advise the forklift operator where the skidded freight should be transferred next. A display device preferably shows the outbound destination in graphical format, and the driver transfers the article of freight to the appropriate storage location. The central or local computer contains software designed to determine the loading sequence and provide instructions. The RF scanner on the arch also scans the RF tag on the forklift providing a timestamp.

The forklift includes an electronic scale which weighs the skidded freight. If the weight information has been transferred to the RF label, the weight data can be read from the RF label and placed in the local computer. If not, the weight information can be transferred into the arch system and loaded into its local computer by conventional means, such as a radio interconnected with the scale.

As the freight is driven to the arch or arch zone, an scanning system determines the dimensions of the skidded freight. As explained in detail below, under the methods and systems of the present invention, one or more devices are utilized to automatically determine the weight and/or dimensions of packages to be shipped. Devices or systems that could be incorporated into the present invention to obtain this information are generally known in the art and disclosed, for example, in U.S. Pat. Nos. 5,636,028; 5,661,561; 5,699,161; 5,719,678; 5,734,476; and 5,770,864, the disclosures of which are hereby incorporated herein by reference. The weight and dimension information are transferred to the local computer and/or to a central computer. Preferably, digital pictures of the freight are also taken and placed into the computer system. If a local computer is used, it is preferably hard wired or otherwise connected (e.g. radio) with the central computer system. The central system can be used to generate billing data, shipping information, and instructions as to how to load the skidded freight.

The scanning system to determine the dimensions of the freight as it is held and/or transferred by the forklift will preferably include means to mask out the forklift truck and/or its components (such as the forks) from the freight itself. The scanning system will include a sufficient number of scanners, cameras, or other optical devices and points of reference to generate, through an algorithm or software package, dimensional information. The dimensional information will at least include the general outside dimensions of the freight and most preferably will also provide an accurate three dimensional outline of the general or specific shape of the freight. The result is a "minimum bounding box," which is the cubic space taken up by the freight when loaded in a ULD. For example, if a drum of liquid is banded to a wooden skid, the dimensions of the drum are not critical, but rather the dimensions of the skid. In this example, therefore, the minimum bounding box would be the length and width of the skid times the height of the drum and skid. The customer must pay for the air space above the skid because it cannot be used for other freight.

Once an article of freight is passed through the arch system, the article will be temporarily stored in a staging area. The staging area can include a storage rack, or a similar storage system with separately identified bins or spaces. Preferably, each bin or storage space includes a separate RF reader or scanner. By activating a scanner to read information from the RF tag shortly before, when, or after an article of freight is placed in the bin or space, the system can determine whether the forklift operator in fact put the freight into the correct, designated location. It will also allow a centralized computer to know where each article of freight is located at any given time. The above process of moving articles of freight through the arch system will continue several times, until a sufficient number of freight is transported through the arch to permit one or more ULD containers (or trucks) to be loaded.

Figure 4:
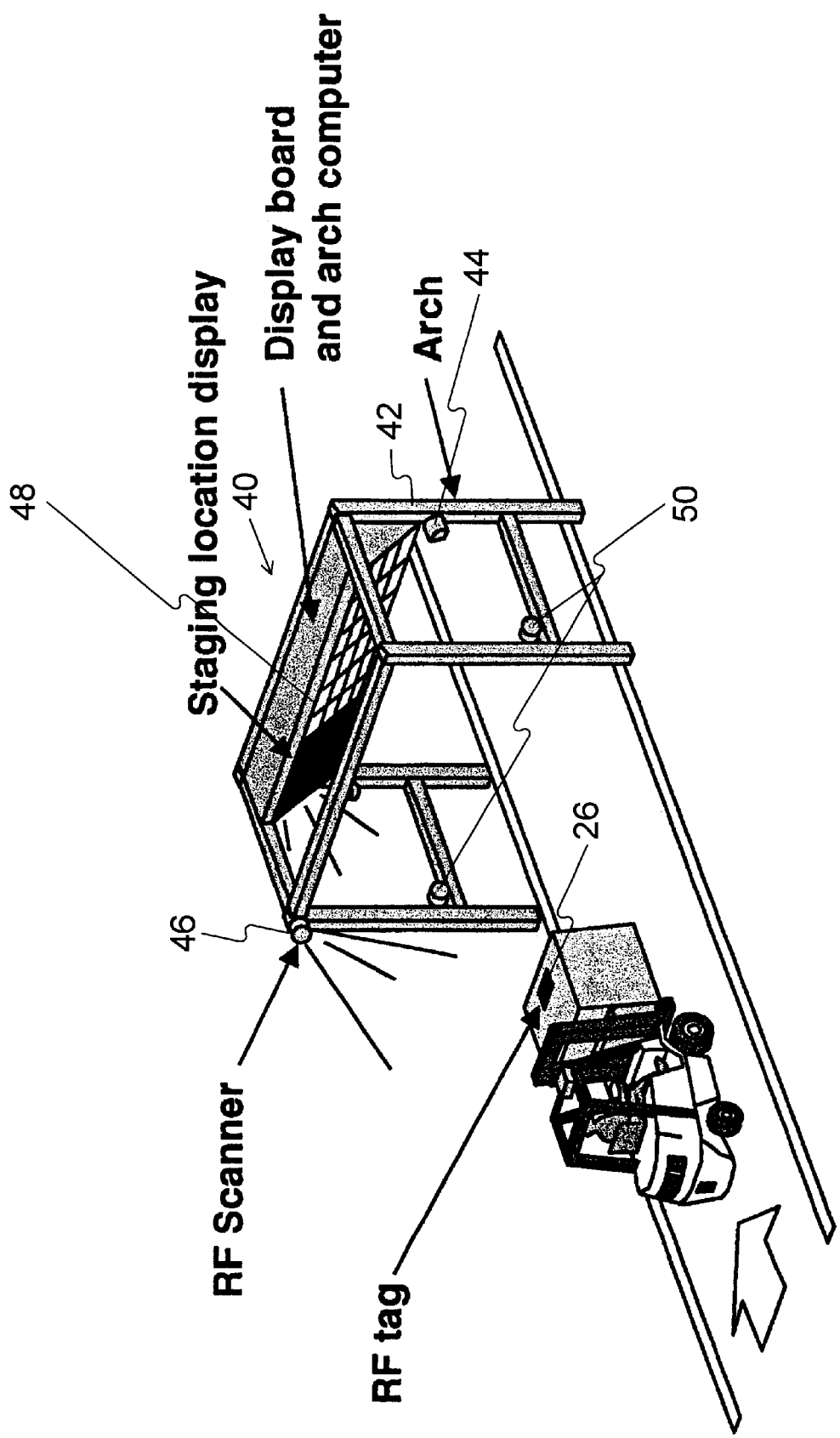
FIG. 4 is an isometric view depicting an arch zone of an embodiment of the present invention, through which the loaded forklift truck is passed as it leaves the loading area shown in FIG. 1.
Figure 5:
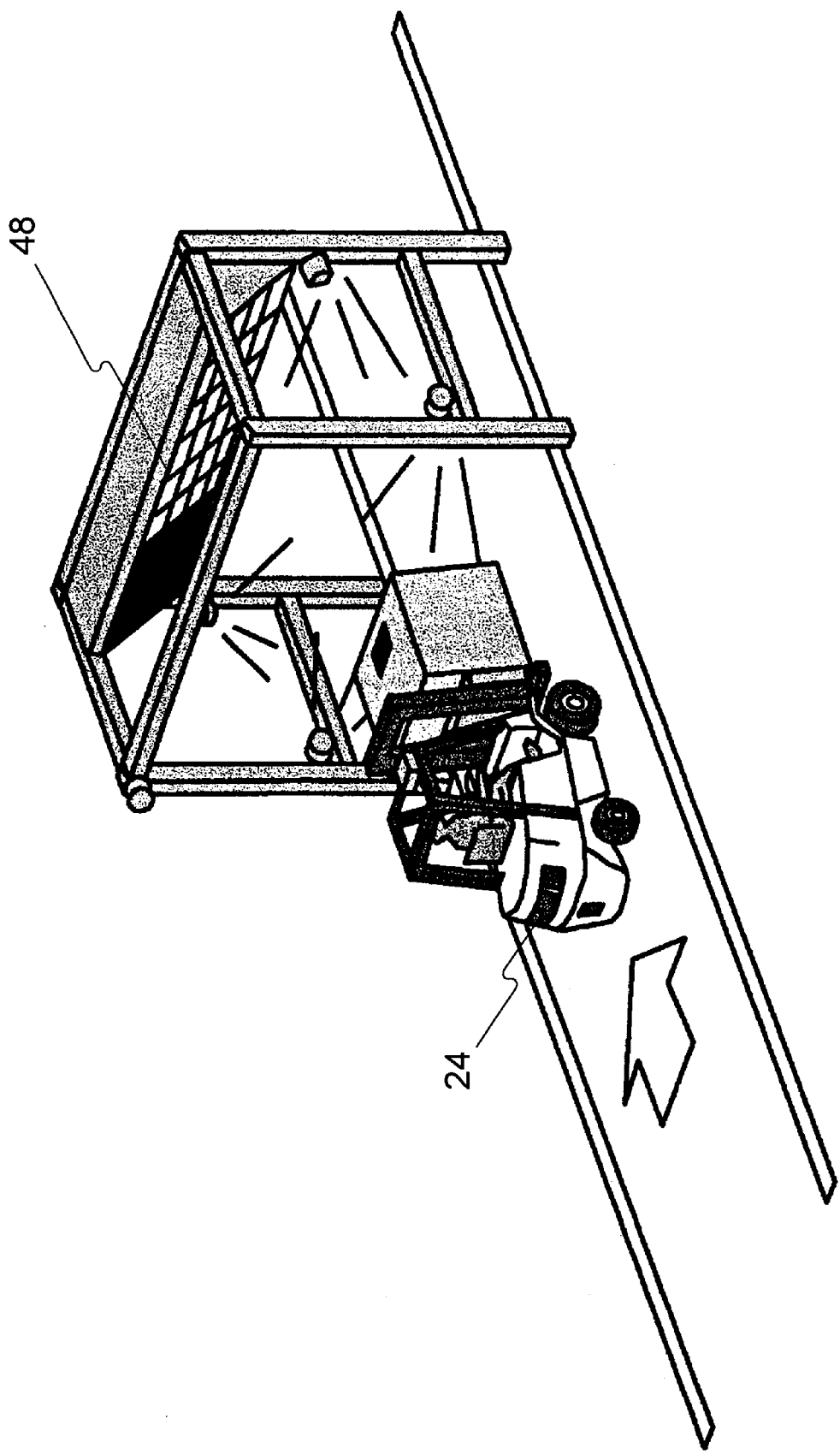
FIG. 5 is a view similar to FIG. 4 but showing the loaded forklift truck entering the arch zone.

As shown in FIGS. 4 through 5, in the preferred embodiment of the invention the driver of the forklift approaches the arch with an article of freight on the forklift. As the freight approaches the arch area, an RF scanner on the arch, or proximate the arch, interrogates the RF tag on the skid to identify the package tracking number, destination 3-letter ID, and weight which are sent to an arch computer memory. The arch computer looks up a table to convert the 3-letter ID to the outbound staging location in the facility and provides the driver of the forklift with information advising him or her where to place the article of freight. For example, an arch area might include a staging location display board 48 to which information will be provided to direct the driver to the appropriate intermediate staging area. This can, by means of example only, be done by colors, numbers, words, or visual indication. The driver reads the display as he passes through the arch and heads toward the appropriate staging location. The instructions also could be provided to the driver by an audio system or through earphones.

Figure 6:
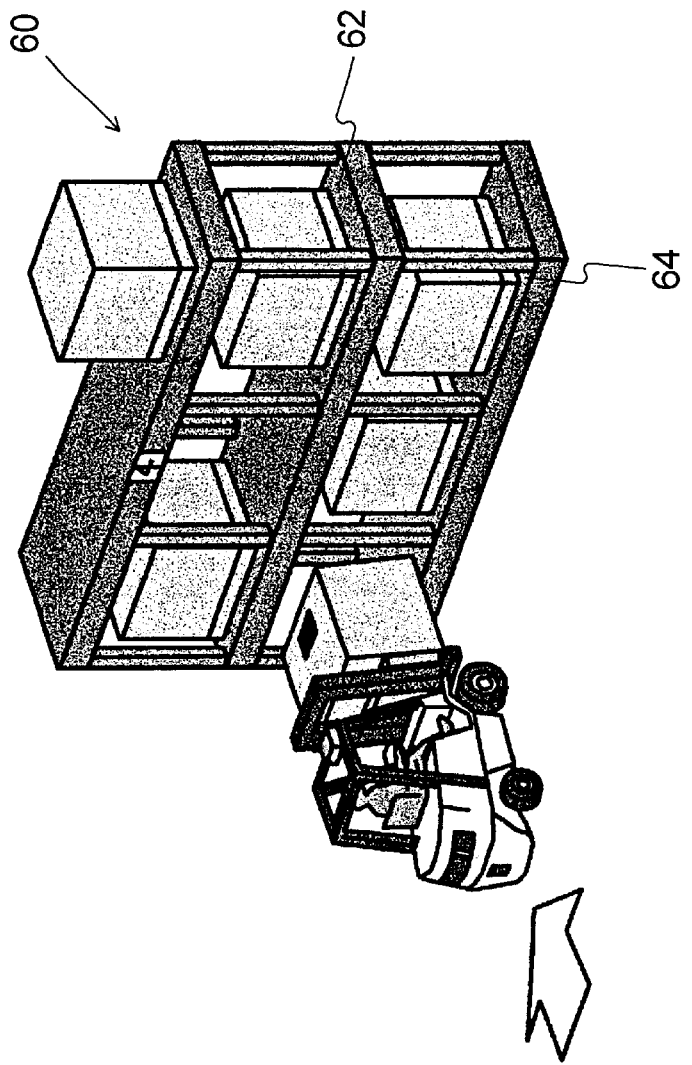
FIG. 6 is an isometric view depicting a intermediate zone or staging area of the receiving and shipping facility of an embodiment of the present invention.
Figure 6:
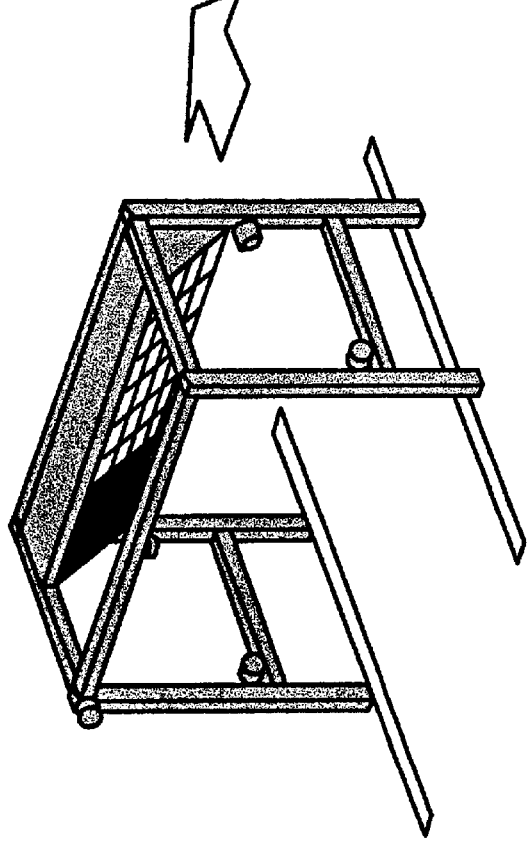

An example of a staging area is shown in FIG. 6. The staging area includes a storage rack 60 with a plurality of separate bins 62. Each staging area, be it a bin in a storage rack or a preselected area, preferably includes an RF scanner 64. The RF scanner reads the RF tag on an article of freight and transfers at least the identification data to a local computer, or the central computer, or both. The system will thereby have an updated indication of the loading of the various articles of freight, at any given time. The RF scanner will also identify the forklift through its RF tag to provide a timestamp, and to initiate the download of dispatcher information to a terminal on the forklift via RF signal.

As articles of freight are processed and placed into the staging area, the local or central computer system applies an algorithm to the data and defines the order and manner in which the stored freight is to be loaded into the ULD, based on known and detected conditions, such as the size of the ULD, the number, size, weight, and shape of the articles of freight, and the final or intermediate destinations of the freight. By means of example only, aspects of one general algorithm is set forth in FIG. 11. The instructions are then provided to the forklift operator through displays or other electronic output devices. As the process continues, a ramp agent at the outbound or final loading ramp enters load parameters into the computer associated with the containers, or aircraft, or truck, to which the articles of freight are to be loaded. Preferably the containers also include an identifying barcode or RF tag, and the agent scans the container number into the system. This information is preferably loaded by a small handheld scanner.

When a sufficient number of articles of freight have been unloaded, weighed, and measured according to the present invention, the system provides a visual or audio indication that loading of the articles should begin.

To that point, the system provides an audio or visual indication to the forklift operator to alert the loader that he may start to load. For example, a flashing light may illuminate at a particular container location, indicating that the loading should begin and further indicating that the particular article of freight in the particular flashing bin should be first loaded. Preferably, the system includes a visual display or audio output at the loading area, to also advise the operator where a particular container should be loaded. Again, for example, a flashing light could illuminate a ULD location to direct the loader's attention to a given loading area. The display can be sufficiently sophisticated to even indicate a particular location in a ULD where the particular article of freight should be located.

In one embodiment, a list 66 at the ULD indicates to the forklift operator that the ULD is ready to load. In addition, a light 67 on the intermediate storage bins or storage areas identifies the bin from which the operator should take an article of skidded freight, as the loading process proceeds. The lights or signal devices are activated by a programmed computer, based on the transactional data regarding the articles of freight. Thus, as a forklift operator drives toward the staging area, he or she will be told what article of freight to pick-up. The system can also be designed to visually instruct the operator where to take the freight next.

Figure 7:
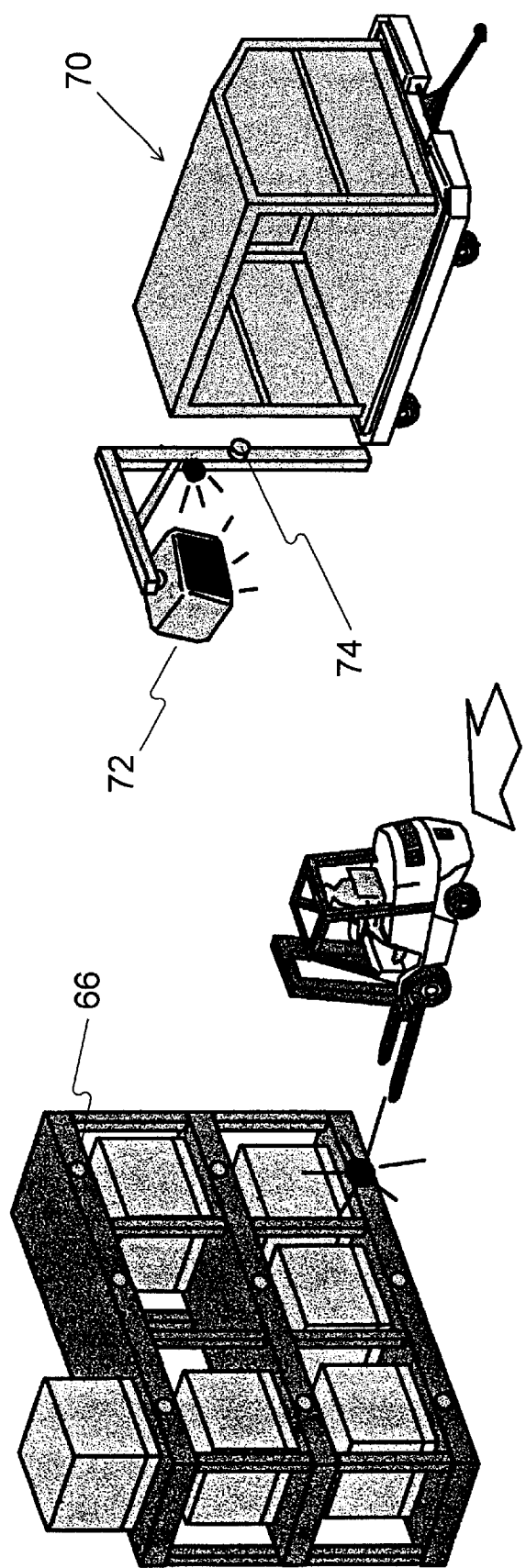
FIG. 7 is an isometric view illustrating a staging area and a loading zone of the receiving and shipping facility according to the present invention.
Figure 8:
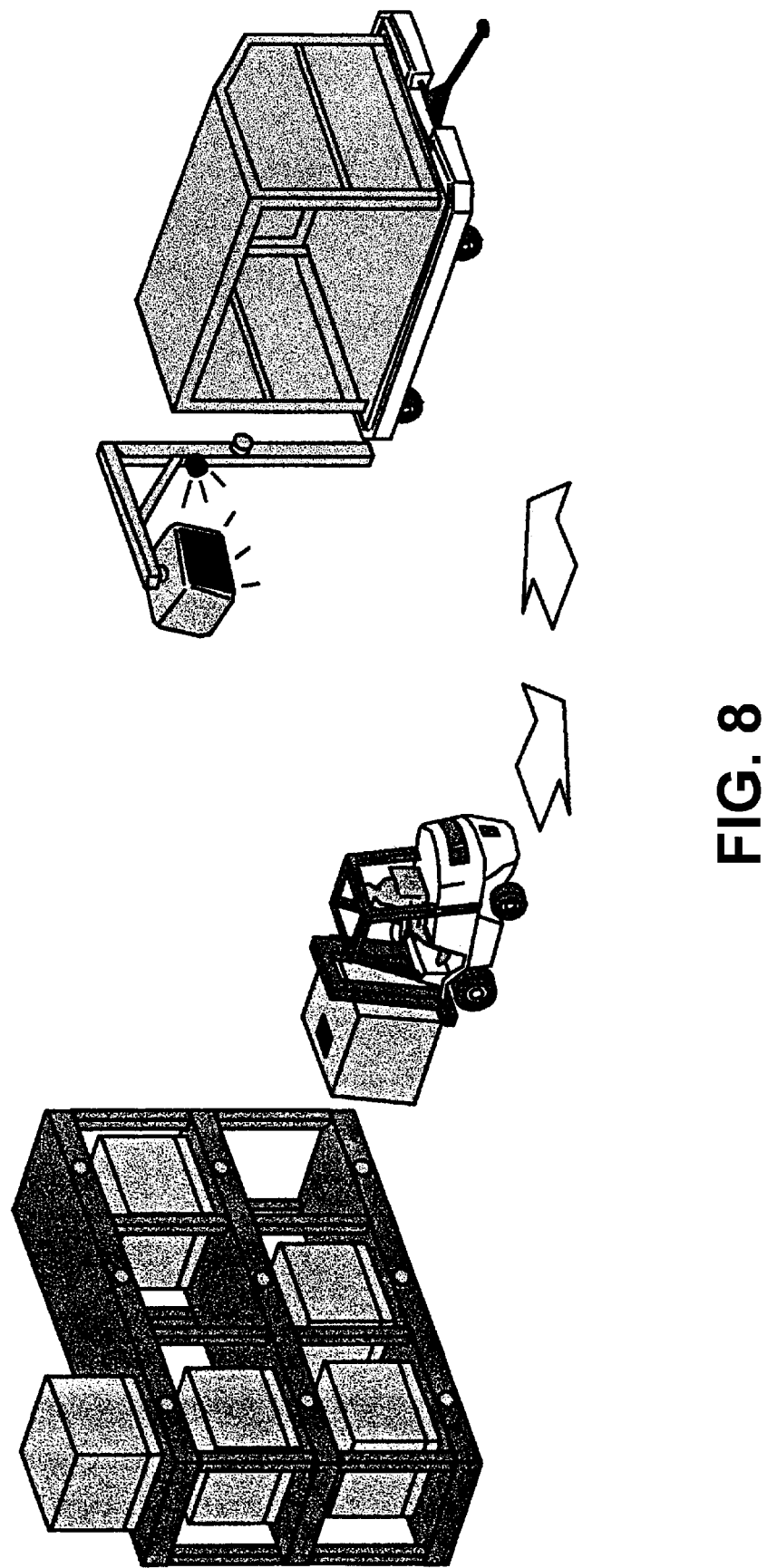
FIG. 8 is a view similar to FIG. 7 but depicting the transfer of articles of freight from the staging area to the loading area.

As that freight is brought to the designated loading area 70 (See FIG. 7), a second display 72 in communication with the computer system provides the operator with loading instructions. These instructions preferably include visual instructions and a visual representations of the freight and ULD to be loaded. Preferably, the instructions indicate precisely where a particular article of freight should be loaded in a given ULD and the appropriate orientation. This process continues until the freight is fully loaded, according to the program algorithm and the transactional data. The freight is then shipped to its next destination or transfer facility where the bar code label and RF tag can be interrogated and the process continued.

In a preferred embodiment, the local computer determines when there is a sufficient amount of freight to start loading one or more container and what freight should be provided in a given container.

As the loader removes an article of freight from the staging rack, an RF sensor in the bin detects the removal of the correct skid. If the forklift operators instead attempts to pick-up the wrong article of freight, the RF sensor through its interconnection with the local or central computer will determine that the wrong article has been taken. The system can then provide an alarm or other indication that will notify the forklift operator of the error. If the operator picks-up the correct article, a bin light or other indication will be turned off, effectively advising the operator that he has picked-up the desired article of freight.

Preferably, at or proximate the final loading area, there will be a visual display or audio system interconnected with the computer system. The display preferably will advise the loader how to load the skid in the container, and the operator will then load the skid in the desired location. An RF scanner 74 proximate the ULD will sense the RF tag on the article and upload the information to the server to ensure that the correct skid has been loaded. In addition, the RF scanner will read the RF tag on the forklift to provide a timestamp. The transactional data loaded into the computer through this process can also be used to create a manifest. Sensing the RF tag as the article is loaded also serves as a safe guard, since if the wrong article were loaded in a given ULD, the system would detect the error and so advise the loader via audible or visual alarm. After the last article of freight has been loaded, the system creates a manifest for the container and the container is closed.

Figure 10:
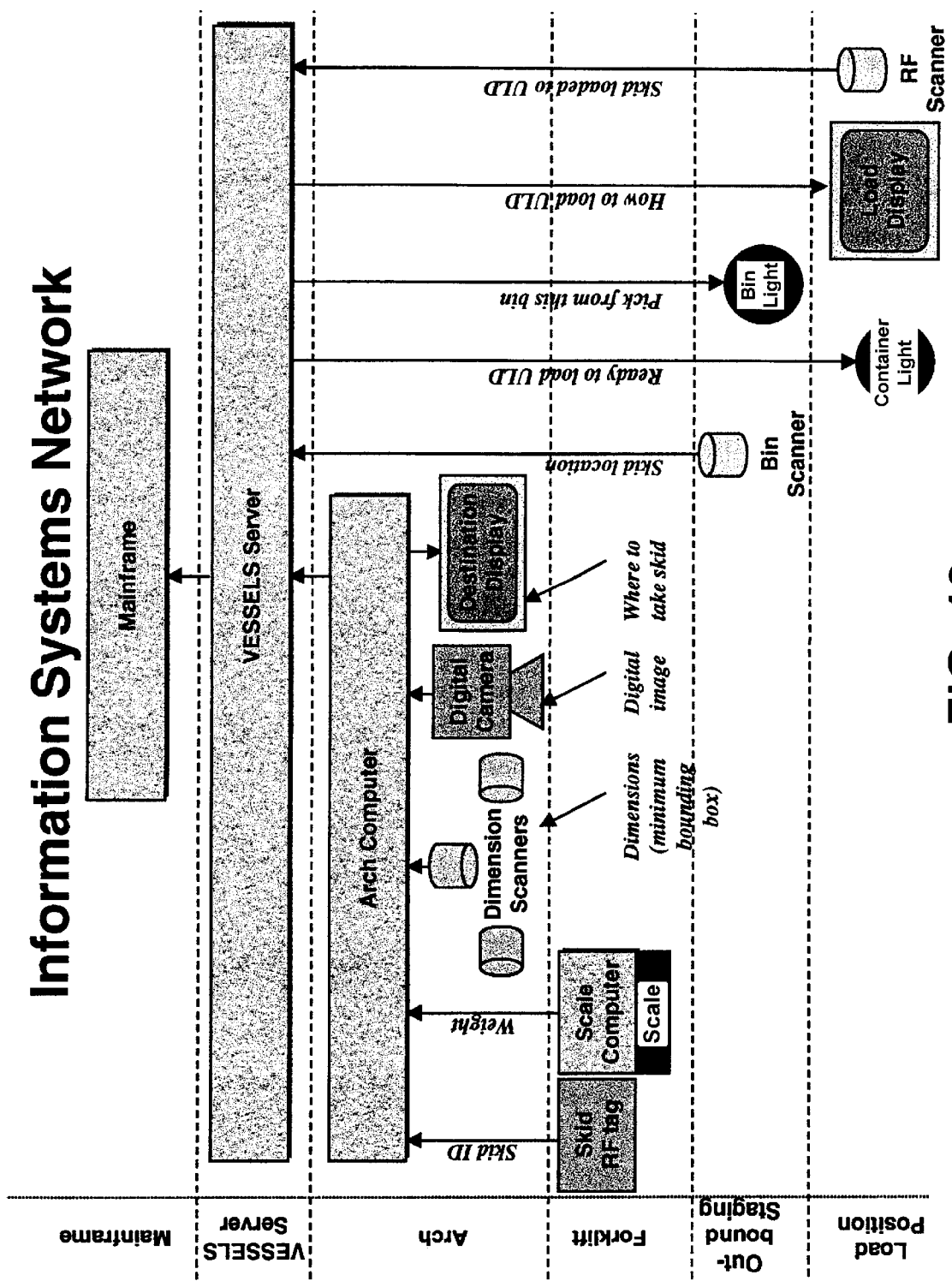
FIG. 10 is a schematic diagram illustrating a computerized control system according to an embodiment of the invention.

The general devices and interrelationships of a network according to one embodiment of the present invention is shown in FIG. 10. Various computers, sensors, and displays are illustrated, as are the relative relationships and communications between the devices according to this embodiment.

As shown in FIG. 10, the computer hardware located at each receiving and shipping facility includes a server (identified in the drawings as a "vessels" server), the arch computer, and the scale or onboard forklift computer for receiving or inputting information into the several operating components at each facility. The facility's server is in communication with a central system to which the overall system of freight handling and shipping is connected by wire or by radio. Information regarding each article of freight, as it is handled at various receiving and shipping facilities within the system, are held in the central memory and are available for tracking, unloading, staging, and loading articles and for performing all needed tracking and business transactions.

Although the articles of freight in the preferred embodiment are transported at least in part by forklift, the present invention also could be applied to and incorporated within a conveyor system designed to transport skidded freight from one location to another.

From the accompanying drawings and description, it will be seen and understood that the receiving and shipping facility, at which freight is initially received for sorting and loaded for shipment in ULDs, is equipped with a receiving area at which each article of incoming freight is unloaded, a staging area at which the articles of freight are stored temporarily, and an outboard freight loading area at which the articles of freight are loaded in the ULDs, or similar large containers or beds for further shipment.

Preferably, each such facility includes at least one vehicular freight transfer device, such as a forklift truck, equipped with a weighing device or scale, an onboard computer, and a scanner programmer. Also, each such facility is equipped with an arch zone electronic devices including an arch computer, a display to direct the driver of the forklift truck, an RF scanner, dimensioning optical scanners to determine the dimensions and shape of each article of freight, and a digital camera for recording a digital image of each article. The arch zone is located between the receiving area shown in FIG. 1 and the staging area shown in FIGS. 6 and 9 so that a full complement of information regarding each article of freight has accumulated as each article of freight is transferred by the forklift truck from the loading area to the staging area.

As explained above, in one aspect of the invention, the system determines the dimensions of a article of freight, such as a pallet load, when the freight is moving on the forklift truck or similar mechanical system to transport the freight within a transfer facility. At about the same time, shipping data about the freight, and also preferably from the particular forklift truck carrying the freight, is read into the computer component of the system. The resultant dimensional information and shipping data regarding the packages and loads are then transferred (e.g. by direct connection or by radio) to a main computer system that includes data and software designed to bill the customer, advise the shipper and customer of the status of the freight, and generate instructions or procedures to maximize the reliability, efficiency, and economics of the shipping process. In an alternative, the instructions and procedures can be generated by a local computer.

By way of example, the systems and methods of the present invention preferably utilize an algorithm or similar software which utilizes the shipping, weight, and dimension data and produces instructions concerning the optimal procedure and the order of moving, sorting, and loading freight, especially when the freight is to be loaded into ULDs. These instructions are conveyed to an operator, such as a driver on the forklift, so that the operator can utilize this information to efficiently load the container. In some embodiments, the information can be transferred to the operator via a video display, such as a display board or a monitor, or through speakers or light systems. In other aspects of the invention, the information can be transferred to the operator via a computer or an audio or visual output device placed on the forklift, or carried by an operator. The instructions can be transferred through a host of electrical, or electronic, or electromechanical devices, such as lights, buzzers, headsets, and so forth.

Preferably all such articles of freight will have or receive a bar code label that identifies the article of freight and is associated with transactional data already in the centralized computer system. The articles of freight preferably will be transported in one or more ULDs, during the shipping process. Preferably, all articles of freight will also be weighed and measured, and the data will be processed to bill the customer and optimize the shipping process. Larger freight will be unloaded, moved, and reloaded by forklifts or conveyors and preferably weighed and dimensioned while moving on the forklift or conveyers. Smaller packages will be loaded, moved, and unloaded by hand at least in part and will be weighed and dimensioned as part of that process.

In at least some embodiments, the part of the system used to weigh and measure skidded or loose freight includes a fixed or portable unit with an arch or frame through which a forklift can be driven, or a conveyor can run. The arch system can be positioned at loading docks proximate the rear bay of trucks to be unloaded, at a central position at the facility, or at other positions between the truck to be unloaded and the ULD and/or aircraft to be loaded. The system preferably includes a digital camera at the arch and a device or system to read a RF (radio frequency) tag or a bar code on the freight. Preferably, the system of the present invention includes a storage rack or area with bins to store freight after it is scanned but before it is loaded, a display board associated with the arch unit to instruct the forklift operator how to process the freight and where to temporarily store the skidded freight, and a video display in the loading zone to instruct the forklift operator precisely where to load each item of skidded freight within a given ULD container, within the bed of a plane or truck that will carry the freight.

All of the above devices are preferably connected or interconnectable with a local and/or central computer system, so that the data detected can be utilized by the computer and its associated software to optimize the shipping process.

It will be apparent to those skilled in the art that various modifications and variations can be made in the methods and systems of the present invention without departing from the scope or spirit of the invention.

Other embodiments of the invention will be apparent to those skilled in the art from consideration of the specification and practice of the invention disclosed herein, it is intended that the specification and examples be considered as exemplary only, with a true scope and spirit of the invention being indicated by the following claims.

What is claimed is:

1. A method for staging and shipping articles of freight at a transfer facility comprising the steps of:
   placing on each of a plurality of articles of freight a radio frequency tag capable of receiving and storing transactional data regarding the article to which it is placed;
   determining at least the approximate weight and outer dimensions of each article of freight;
   transferring to and storing in said radio frequency tags transactional data representative of at least the weight, the outer dimensions, and the desired destination of the article of freight on which a respective radio frequency tag is placed;
   reading transactional data from each radio frequency tags as its associated article of freight is transferred from one location to another within the facility and storing the read transactional data in one or more memory devices;
   temporarily storing the articles of freight in an intermediate holding area, based on the transactional data and a programmed computer interconnected with a memory device storing said transactional data; and
   sequentially loading the articles of freight, based on the transactional data and a programmed computer interconnected with a memory device storing said transactional data.

2. The method of claim 1 further comprising the steps of:
   placing on said articles of freight an identifying bar code associated with transactional data regarding the article of freight on which it is placed;
   scanning the bar code on each article of freight; and
   transferring to the radio frequency tag associated with each article of freight the identifying data on the bar code associated with that article of freight.

3. The method of claim 2 further comprising the steps of:
   placing on said articles a readable code identifying the destination of each article of freight;
   reading the readable destination code; and
   transferring to the radio frequency tag associated with an article of freight the destination code of the article of freight.

4. The method of claim 1 further comprising the steps of:
   transferring at least some of the articles of freight by a mechanical apparatus;
   weighing said at least some of the articles of freight while they are on said mechanical apparatus; and
   transferring data representing the weight of the articles of freight to said radio frequency tag.

5. The method of claim 1 wherein the outer dimensions of each article of freight are sensed by optical sensors while the article of freight is on the mechanical apparatus.

6. The method of claim 5 wherein the mechanical apparatus is a fork lift truck.

7. The method of claim 5 wherein the mechanical apparatus is a conveyor system.

8. The method of claim 6 further comprising the steps of providing instructions to the operator of the fork lift truck regarding the transfer and loading of the articles of freight, based on the transactional data and a programmed computer interconnected with a memory device storing said transactional data.

9. The method of claim 1 wherein said instructions include visual instructions.

10. The method of claim 8 wherein said instructions include audio instructions.

11. The method of claim 8 wherein said instructions include audio and visual instructions.

12. The method of claim 1 wherein the intermediate holding zone includes a plurality of preselected temporary storage locations for articles of freight and further comprising the steps of providing a radio frequency tag sensor at said temporary storage locations, reading transactional data from the radio frequency tag placed on an artide of freight when it is placed at a given temporary storage location, and transferring the sensed transactional data to a memory device to which the programmed computer is interconnected.

13. The method of claim 9 wherein the facility includes an loading area having a plurality of preselected outbound locations where articles of freight are to be loaded for shipment from the transfer facility and a radio frequency tag sensor is provided at each of said outbound locations and further comprising the steps of reading transactional data from the radio frequency tag placed on an article of freight when it is transferred to a given outbound location and transferring the sensed transactional data to a memory device to which the programmed computer is interconnected.

14. The method of claim 1 further comprising the steps of determining a preferred order of loading a given selection of articles of freight based on the transactional data and a programmed computer interconnected with a memory device storing said transactional data and instructing an operator at the transfer facility to load the articles in that order.

15. The method of claim 1 further comprising the steps of notifying an operator at the transfer facility if the articles of freight are not loaded in the preferred order.

16. The method of claim 1 further comprising the steps of sensing the shape of each article of freight, storing data representative of a visual reproduction of each article, and displaying to the operator a visual reproduction of each article.

17. The method of claim 1 wherein said step of determining at least the approximate weight and outer dimensions is achieved through electronic sensors and associated devices.

18. The method of claim 1 wherein the outer dimensions of the articles of freight are determined while the articles are transferred toward the intermediate holding area in the facility.

* * * * *

UNITED STATES PATENT AND TRADEMARK OFFICE
CERTIFICATE OF CORRECTION

PATENT NO. : 6,332,098 B1
DATED : December 18, 2001
INVENTOR(S) : Michael J. Ross et al.

It is certified that error appears in the above-identified patent and that said Letters Patent is hereby corrected as shown below:

<u>Title page,</u>
Item [75], in the Inventors named, the name "Carlos M. Barrios" should be deleted.

Signed and Sealed this

Eleventh Day of June, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,332,098 B2  
DATED         : December 18, 2001  
INVENTOR(S)   : Michael J. Ross et al.

Page 1 of 1

It is certified that error appears in the above-identified patent and that said Letters Patent is hereby corrected as shown below:

<u>Title page,</u>
Item [75], Inventors, the name "Carlos M. Barrios" should be deleted.

<u>Column 12,</u>
Lines 31-42, claims 8-11 should be deleted.
Line 53, "claim 9" should read -- claim 1 --.

Signed and Sealed this

Sixth Day of August, 2002

*Attest:*

JAMES E. ROGAN
*Attesting Officer*     *Director of the United States Patent and Trademark Office*